United States Patent
He et al.

(10) Patent No.: US 10,412,665 B2
(45) Date of Patent: Sep. 10, 2019

(54) AP GROUP INFORMATION PROCESSING METHOD AND ENB

(71) Applicant: ZTE CORPORATION, Shenzhen, Guangdong (CN)

(72) Inventors: Meifang He, Shenzhen (CN); He Huang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/751,438

(22) PCT Filed: Apr. 21, 2016

(86) PCT No.: PCT/CN2016/079936
§ 371 (c)(1),
(2) Date: Mar. 19, 2018

(87) PCT Pub. No.: WO2016/180213
PCT Pub. Date: Nov. 17, 2016

(65) Prior Publication Data
US 2018/0242226 A1    Aug. 23, 2018

(30) Foreign Application Priority Data
Aug. 11, 2015 (CN) .......................... 2015 1 0490605

(51) Int. Cl.
| | | |
|---|---|---|
| *H04W 48/12* | (2009.01) | |
| *H04W 24/04* | (2009.01) | |
| *H04W 36/08* | (2009.01) | |
| *H04W 48/20* | (2009.01) | |
| *H04W 48/14* | (2009.01) | |

(Continued)

(52) U.S. Cl.
CPC .......... *H04W 48/12* (2013.01); *H04W 24/04* (2013.01); *H04W 36/08* (2013.01); *H04W 48/14* (2013.01); *H04W 48/20* (2013.01); *H04W 36/0061* (2013.01); *H04W 84/12* (2013.01)

(58) Field of Classification Search
CPC ..... H04W 24/04; H04W 36/08; H04W 48/12; H04W 48/20; H04W 84/12
USPC ....................................................... 370/329
See application file for complete search history.

(56) References Cited

U.S. PATENT DOCUMENTS

2015/0201334 A1    7/2015  Li et al.
2015/0365887 A1*  12/2015  Tong .................... H04W 76/14
                                                        370/328

(Continued)

FOREIGN PATENT DOCUMENTS

| CN | 104170421 A | 11/2014 |
|---|---|---|
| CN | 104469775 A | 3/2015 |

(Continued)

OTHER PUBLICATIONS

International Search Report in international application No. PCT/CN2016/079936, dated Jul. 15, 2016, 2 pgs.

(Continued)

*Primary Examiner* — Stephen J Clawson
(74) *Attorney, Agent, or Firm* — McDonald Hopkins LLC (57) ABSTRACT

An AP group information processing method and an eNB. The method comprises: an eNB acquires AP group information of an AP group; and the AP group information is transmitted to a user equipment via an air interface downlink message of the eNB.

14 Claims, 8 Drawing Sheets

(51) Int. Cl.
 *H04W 84/12* (2009.01)
 *H04W 36/00* (2009.01)

(56) References Cited

U.S. PATENT DOCUMENTS

2016/0119861 A1* 4/2016 Jin .................. H04W 48/16
 370/338
2016/0302122 A1* 10/2016 Masini ............. H04L 61/1511

FOREIGN PATENT DOCUMENTS

EP         2887744 A1    6/2015
WO     2014047887 A1    4/2014

OTHER PUBLICATIONS

English Translation of the Written Opinion of the International Search Authority in international application No. PCT/CN2016/079936, dated Jul. 15, 2016, 3 pgs.
Nokia Networks. "Control plane protocol architecture for LTE-WLAN integration" May 29, 2015, 3GPP TSG-RAN WG2 Meeting #90 R2-152103, Section 2.2, 4 pgs.
Intel Corporation et al. "Agreements on LTE-WLAN Radio Level Integration and Interworking Enhancement, Change Request 36.300 V12.5.0", Apr. 2015, 3GPP TSG-RAN2 Meeting 89-bis R2-152922, Annex xx, section YY. 5 pgs.
Qualcomm Incorporated et al. "WLAN Selection and Mobility", May 2015, 3GPP TSG-R4N WG2 Meeting #90 R2-152739, section 2, 6 pgs.

* cited by examiner

AP GROUP INFORMATION PROCESSING METHOD AND ENB

TECHNICAL FIELD

The present disclosure relates to, but not limited to, the field of wireless communications, and particularly to a method for processing Access Point (AP) group information and an Evolved Node B (eNB).

BACKGROUND

Along with continuous evolution of wireless communication technologies and standards, mobile packet services are greatly developed, and a data throughput capacity of single User Equipment (UE) is continuously improved. For example, for a Long Term Evolution (LTE) system, data transmission at a maximum downlink rate of 100 Mbps may be supported within a 20 M bandwidth, and in a subsequent LTE Advanced system, the data transmission rate may further be increased and may reach up to 1 Gbps.

Expansive increase of data traffic of UE makes existing network resources gradually starved, particularly under the condition that it is impossible to widely distribute a network for a new-generation communication technology (for example, 3rd-Generation (3G) and LTE), followed by an incapability in meeting rate and traffic requirements of users and worsening of user experiences. How to prevent and change such a condition is a problem an operating company must consider. On one hand, popularization and network deployment of new technologies are required to be accelerated; and on the other hand, existing networks and technologies are expected to be enhanced to achieve a purpose of rapidly improving network performance. It is well known that a Wireless Local Area Network (WLAN) which has been widely applied at present, particularly an Institute of Electrical and Electronics Engineers (IEEE) 802.11 standard-based WLAN, besides a wireless network technology provided by the 3rd Generation Partnership Project (3GPP), has been widely applied to hotspot access coverage in families, enterprises and even the Internet, wherein a technical specification proposed by the Wireless Fidelity (Wi-Fi) Alliance is applied most widely, so that a Wi-Fi network is usually equivalent to the IEEE 802.11 standard-based WLAN in practice. A Wi-Fi module is also adopted to describe a WLAN supporting wireless transceiver and processing module in a network node hereinafter without confusions.

On such a premise, some operating companies and corporations have proposed to fuse a WLAN and an existing 3GPP network to implement joint transmission to achieve purposes of offloading and network performance improvement. The 3GPP Service and System Aspects 2 (SA2) approves an Access Network Discovery and Selection Functions (ANDSF) solution, and provides a mode of selecting a target access network for UE according to a strategy of an operating company.

A communication protocol 3GPP Release 10 (R10) defines an ANDSF standard, and an ANDSF implements intelligent network selection as an access anchor, implements effective offloading of network access through interactive cooperation of networks and UE, and is consistent with an operation direction of cooperation of multiple networks in the future. The ANDSF formulates a strategy based on information such as a network load, a capability of the UE and user subscription information, helps a user of the UE to select an optimal network system for access and implements cooperative operation of multiple access manners. The ANDSF may be deployed independently, and may also be arranged together with another network element. At present, a mainstream view of the industry is that the ANDSF may be deployed on Program-Controlled Computer (PCC) equipment.

An ANDSF is a core-network-based WLAN interworking solution, and does not consider influence on an access network. In addition, since the ANDSF is a relatively static solution, and may not be well adapted to a condition that a network load and channel quality dynamically change, a WLAN interworking discussion on a 3GPP access network group is also conducted. During WLAN and 3GPP wireless interoperation in 3GPP Release 12 (R12), a WLAN offloading execution rule and a triggering mechanism are introduced.

However, a core network mechanism and an auxiliary information mechanism from a Radio Access Network (RAN) may not provide load and channel conditions for a network side to use in real time for combined use of radio resources. In addition, data from the same bearer may not serve on both 3GPP and WLAN links. Therefore, a requirement on integration of a WLAN and a 3GPP network is remade in the 65th RAN plenary meeting.

Compared with a strategy and triggering-based WLAN offloading solution which has been researched at present, RAN layer aggregation-based WLAN and 3GPP network integration, called as WLAN and 3GPP network tight coupling for short, is similar to carrier aggregation and dual connectivity, and provides better control and utilization of resources on dual connectivity for an overall system. Tight integration and aggregation in a radio layer allows more real-time joint scheduling of radio resources of a WLAN and a 3GPP network, thereby improving Quality of Service (QoS) for a user and an overall system capacity. By better managing radio resources between users, an overall throughput of all the users may be improved, and the overall system capacity may be improved. Based on a real-time channel condition and a system service condition, each link scheduling decision may be made to a layer of each packet. A user plane is anchored in a reliable LTE network, and performance may be improved by rollback to the LTE network.

WLAN and 3GPP network tight coupling may be applied to a co-located scenario (an eNB and a wireless AP complete a RAN-layer integration operation through an internal interface) and a non-co-located scenario (the eNB and the AP complete the RAN-layer integration operation through an external interface), which are substantially similar to 3GPP carrier aggregation and dual connectivity respectively.

In a WLAN and 3GPP network tight coupling application scenario, APs may be divided into multiple AP groups. Movement of UE in the same AP group may not be notified to a 3GPP network, and namely, may be transparent to a network element of an LTE network. However, movement of the UE in different AP groups may require a network element of the 3GPP network to participate in control to better balance a load and improve transmission efficiency or quality of a system capacity.

There is now introduced a new problem of how to transmit AP group information to UE to enable the UE to better implement handover in the AP group, thus implementing tight coupling between an LTE network and a WLAN.

SUMMARY

The below is a summary about a subject described in the disclosure in detail. The summary is not intended to limit the scope of protection of the claims.

Embodiments of the disclosure provide a method for processing AP group information and an eNB, which may solve the problem of inconvenience for AP group information interaction.

The technical solutions of the embodiments of the disclosure are implemented as follows.

A first aspect of the embodiments of the disclosure provides a method for processing AP group information, which may include the following actions.

An eNB acquires AP group information of one or more AP groups.

The eNB sends the AP group information to UE through a downlink message via an air interface of the eNB.

According to an embodiment, the action of acquiring, by the eNB, the AP group information of the AP groups may include the following actions.

The AP group information sent from a WLAN Termination (WT) is received.

According to an embodiment, the action of acquiring, by the eNB, the AP group information of the AP groups may include the following actions.

Auxiliary information is received, where the auxiliary information includes at least one of first auxiliary information sent from the UE or second auxiliary information formed by the WT.

AP grouping is performed to form the AP groups based on the auxiliary information according to a grouping strategy.

The AP group information of the AP groups is formed.

According to an embodiment, the method may further include the following actions.

The AP group information is sent to the WT through an Xw interface.

According to an embodiment, the method may further include the following actions.

Upon reception of the first auxiliary information sent by the UE, the first auxiliary information is sent to the WT through the Xw interface, where the WT adopts the first auxiliary information sent to the WT, to form the AP group information.

According to an embodiment, the action of sending the AP group information to the UE through the downlink message via the air interface of the eNB may include the following actions.

The AP group information is carried in a Radio Resource Connection (RRC) reconfiguration message which is sent to the UE.

According to an embodiment, the action of carrying the AP group information in the RRC reconfiguration message which is sent to the UE may include the following actions.

The AP group information is carried in measurement configuration information which is sent to the UE.

Alternatively, the AP group information is carried in tight coupling configuration information which is sent to the UE.

A second aspect of the embodiments of the disclosure provides an eNB, which may include an acquisition unit and a first communication unit.

The acquisition unit is arranged for the eNB to acquire AP group information of one or more AP groups.

The first communication unit is arranged to send the AP group information to UE through a downlink message via an air interface of the eNB.

According to an embodiment, the acquisition unit may be arranged to receive the AP group information sent from a WT.

According to an embodiment, the acquisition unit may be arranged to receive auxiliary information, where the auxiliary information includes at least one of first auxiliary information sent from the UE, or second auxiliary information formed by the WT; perform AP grouping to form the AP groups based on the auxiliary information according to a grouping strategy; and form the AP group information of the AP groups.

According to an embodiment, the eNB may further include a second communication unit.

The second communication unit is arranged to send the AP group information to the WT through an Xw interface.

According to an embodiment, the first communication unit may further be arranged to receive the first auxiliary information sent from the UE.

The eNB may further include:

the second communication unit, further arranged to send the first auxiliary information to the WT through the Xw interface, where the WT adopts the first auxiliary information sent to the WT, to form the AP group information.

According to an embodiment, the first communication unit may be arranged to carry the AP group information in an RRC reconfiguration message which is sent to the UE.

According to an embodiment, the first communication unit may be arranged to implement carrying of the AP group information in the RRC reconfiguration message which is sent to the UE in the following manners: carrying the AP group information in measurement configuration information which is sent to the UE; or carrying the AP group information in tight coupling configuration information which is sent to the UE.

According to the method for processing the AP group information and eNB provided by the embodiments of the disclosure, the AP group information is sent to the UE by the eNB when being transmitted, and in this process, the eNB also acquires the AP group information, so that an LTE network element such as the eNB may conveniently perform AP management and control based on the AP group information. Meanwhile, the eNB sends the AP group information to the UE, so that the problems of tedious transmission of the AP group information, modification to a communication protocol for interaction between a WLAN and the UE and the like, caused by a requirement on sending of the AP group information through a connection of the WLAN and the UE, are avoided.

After the drawings and detailed descriptions are read and understood, the other aspects may be comprehended.

DETAILED DESCRIPTION

Figure 1:
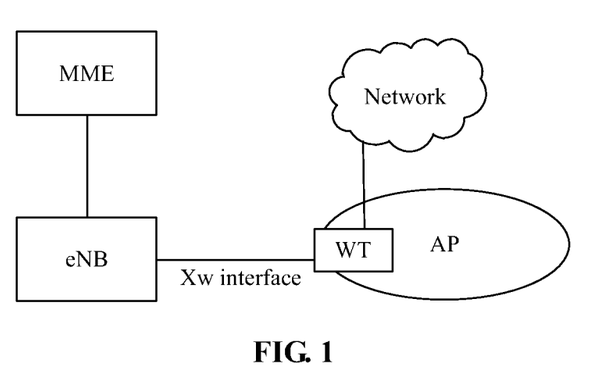
FIG. 1 is a structure diagram of a communication system according to an embodiment of the present disclosure.

FIG. 1 is a structure diagram of WLAN and 3GPP network coupling. That is, an RAN-layer integration operation is completed between an eNB of a 3GPP network and a WLAN network element of a WLAN through an external interface Xw. The WLAN network element includes a WT. The WT may be a logical node integrated on another WLAN network element (for example, an AP in FIG. 1), and may also be a physical node which is independently arranged. The WT performs information interaction with a network element in an LTE network through the interface Xw.

In the embodiments of the application, UE may freely move or perform AP handover based on an automatic control strategy in the UE in the same AP group without notifying the LTE network. When moving in different AP groups or an AP group including the WT, the UE is required to notify and controlled by the LTE network to better implement coupling of the WLAN and the 3GPP network. Then, the UE is required to know about related information of a current AP group. When the UE does not know about the related information of the current AP group, the UE may not implement free movement between APs in the same AP group; and the network element of the LTE network is also required to know about the information of the AP group. When the network element of the LTE network does not know about the information of the AP group, the LTE network may not implement control and decision making about handover of the UE between the APs.

It is found by analyzing FIG. 1 that the AP group information of the APs may be transmitted to the UE through the WT and may also be transmitted to the UE through the eNB. However, signaling is required to be added in communication between the WT and the UE in case of transmission to the UE through the WT, and obviously, modification to a communication protocol of the WLAN is involved. At present, in the field of communications, modification to the communication protocol of the WLAN is strictly required and also has great difficulties, and moreover, no matter whether division of AP groups is completed by the LTE network or the WLAN, the AP group information of the AP groups is required to be backed up to the LTE network. Therefore, on such a basis, a method for processing AP group information of the embodiments of the application avoids modification to the communication protocol of the WLAN on one hand, and reduces a number of transmission times of the AP group information and signaling overhead on the other hand, and the AP group information is transmitted to the UE by the eNB. Obviously, the communication protocol between the WLAN and the UE is not required to be modified at first. In a process of transmission to the UE, the eNB autonomously acquires the AP group information at first, and then both the eNB and the UE both obtain the AP group information by once transmission of the AP group information. Therefore, compared with respective transmission of the AP group information to the eNB and the UE, the number of transmission times of the AP group information and the signaling overhead are reduced.

The technical solutions of the disclosure will further be described below in combination with the drawings and specific embodiments of the specification in detail.

Figure 2:
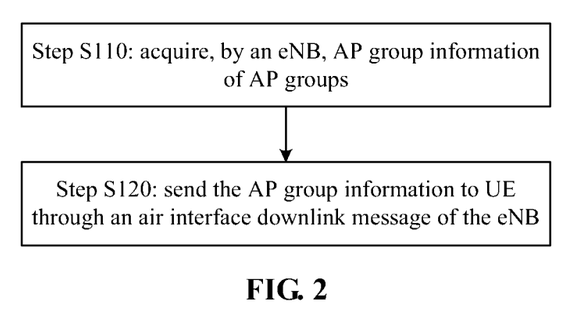
FIG. 2 is a first flowchart of a method for processing AP group information according to an embodiment of the disclosure.

As shown in FIG. 2, an embodiment provides a method for processing AP group information, which includes the following steps.

In Step S110, an eNB acquires AP group information of AP groups.

In Step S120, the AP group information is sent to UE through a downlink message via an air interface of the eNB.

The eNB is an evolved Node B, and is an access network element of an LTE network. The eNB may perform mobile communication with the UE.

In the embodiment, the eNB autonomously acquires the AP group information of the AP groups at first. The AP group information includes identification information of the AP groups, a number of APs, identification information of the APs and service frequency point information of each AP. The identification information of the AP groups may include information such as group numbers or names of the AP groups. The identification information of the AP may include one or more of a Basic Service Set Identifier (BSSID), a Service Set Identifier (SSID) or a Medium Access Control (MAC) address. The service frequency point information of the AP may be arranged to represent a service frequency band corresponding to the AP.

In Step S120, the eNB sends the AP group information to the UE after acquiring the AP group information, and it is not a network element of a WLAN transmitting it to the UE. In such a manner, the UE may acquire the AP group information from the eNB, no communication protocol for sending the AP group information is required to be added in a communication protocol of the WLAN, and the eNB sends the AP group information, so that a characteristic of simplifying transmission of the AP group information may be achieved.

The eNB may acquire the AP group information in at least two manners.

First:

Step S110 may include that: the eNB receives the AP group information sent by a WT.

In the embodiment, it is defined at first that the eNB receives the AP group information from the WT. The AP group information may be formed by any network element in the WLAN, for example, formed by the WT or an AP or an Access Controller (AC). Meanwhile, after forming the AP group information, the WLAN is only required to send the AP group information to the eNB, and is not required to send the AP group information to the UE. Therefore, sending of the AP group information on a WLAN side is simplified.

Figure 3:
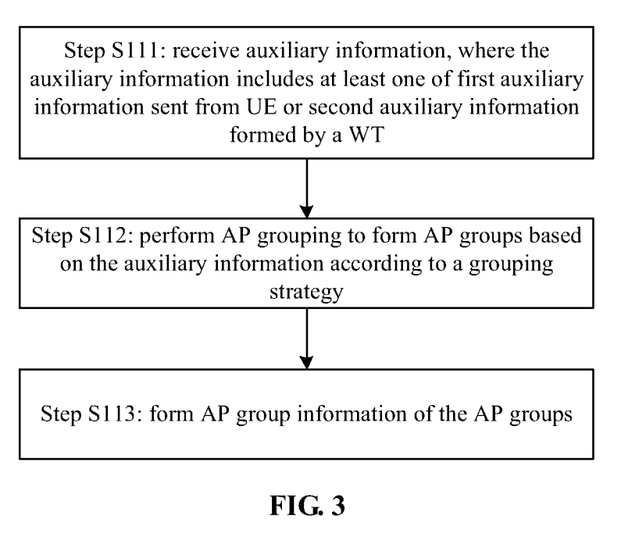
FIG. 3 is a flowchart of acquiring AP group information according to an embodiment of the disclosure.

Second:

as shown in FIG. 3, Step S110 may include the following steps.

In Step S111, the eNB receives auxiliary information, where the auxiliary information includes at least one of first auxiliary information sent from the UE or second auxiliary information formed by the WT.

In Step S112, the eNB performs AP grouping to form the AP groups based on the auxiliary information according to a grouping strategy.

In Step S113, the AP group information of the AP groups is formed.

In the embodiment, the eNB autonomously forms the AP group information.

Although the AP group information autonomously formed by the eNB may be sent to the WT through the Xw interface at first and then sent to the UE through a connection of the WLAN and the UE, such a sending manner is more tedious than direct transmission to the UE by the eNB, and the latter is also not required to modify the communication protocol of the WLAN.

In the embodiment, the eNB may receive the auxiliary information sent from at least one of the WT or the UE to automatically perform AP grouping to form the AP groups and finally form the AP group information based on the AP groups.

The first auxiliary information includes at least one of:
AP information of APs scanned by the UE;
AP information of APs which may be associated by the UE;
service condition information of each AP used by the UE within a specified time;
AP information of APs which are measured and determined to be unavailable by the UE;
AP information of APs which may be scanned but may not be associated by the UE;
association time information of the APs;
load condition information of the APs;
information about APs of which association time is longer than a preset association threshold;
information about APs of which loads are higher than a preset load threshold; or
information about a handover frequency of the UE between the APs.

In the embodiment, the AP information may include identification information and service frequency point information of the AP. The identification information of the AP may include one or more of a BSSID, an SSID or a MAC address.

The APs may send scanning signals for the UE to scan, and then the UE may discover the APs to access the APs.

The APs which may be associated by the UE are APs which may be scanned and accessed by the UE. Some APs are limited to grant or states of the APs, where being limited to the states of the APs includes that own loads of the APs have reached limits, the APs are in an access-reject state and the UE may scan but not access the APs.

The service condition information of each AP used by the UE within the specified time may include: the APs accessed by the UE within the specified time, the APs of which service is utilized, a frequency of access to each AP and the like. The service condition information such as the APs preferred to be accessed by the UE under an indication of a user may include AP utilization recording information of the UE and the like.

The association time information of the APs represents information such as information about durations of connections established between the UE and the APs or time points when associations are established between the UE and the APs.

The load condition information of the APs represents load conditions of the APs, and represents information about whether the APs have idle resources to be associated (connected) or provide WLAN service for more UE or not.

The AP information of the APs of which the association time is longer than the preset association threshold may be arranged to represent the APs keeping connections with the UE for time lengths larger than the preset association threshold.

The AP information of the APs of which the loads are higher than the preset load threshold may be arranged to represent whether current loads of the APs are higher than the preset load threshold or not. When the current loads are higher than the preset load threshold, it is indicated that the current loads of the APs are excessively high.

The information about the handover frequency of the UE between the APs may be arranged to represent the handover frequency of the UE between each AP and the APs for handover.

The second auxiliary information includes at least one of:
position information of the APs;
information about a neighboring relationship between the APs;
initial AP group information;
AP information of unavailable APs;
the AP information of the APs which may be scanned but may not be associated;
the association time information of the APs;
the load condition information of the APs;
the information about the APs of which the association time is longer than the preset association threshold;
the information about the APs of which the loads are higher than the preset load threshold;
network element connection information of the APs; or
the information about the handover frequency of the UE between the APs.

The position information of the APs includes positions where the APs are arranged. The positions where the APs are arranged may determine coverage of WLAN signals sent by the APs and the like.

The information about the neighboring relationship between the APs represents the APs which are neighboring, and handover of the UE between different APs may be facilitated by the neighboring relationship.

The initial AP group information represents the APs initially belonging to the same AP groups and attribute parameters of these AP groups. For example, parameters of access forbidden and the like are temporarily set for some AP groups.

The AP information of the unavailable APs represents the unavailable AP groups. For example, quitting of APs of some AP groups, failures of APs and the like make the AP groups unavailable, and then the AP groups are required to be timely updated to facilitate subsequent AP handover of the UE, load balancing of an LTE network and control over AP handover. In the application, AP handover includes handover from a connection established between the UE and an AP to a connection established with another AP.

The network element connection information of the APs represents WLAN network elements connected with the APs, for example, information about whether the APs are connected through the LTE network through their internal WTs or establish connections with the LTE network through external WTs and WLAN routing or AC equipment connected with the APs. Then, the eNB may conveniently divide the AP groups. For example, APs connected to the same WT are divided into the same AP group or all APs in the same AP group are controlled to be APs connected to the same WT.

For how to specifically perform AP grouping in Step S112 in the embodiment, the following action may be included.

The action of performing AP grouping to form the AP groups based on the auxiliary information according to the grouping strategy includes at least one of the following actions:
coverage areas of N APs of the same AP group are continuously distributed, N being an integer not smaller than 1;
APs of the same AP group are connected to the same WT; or
different AP groups include different APs.

In the embodiment, 2 or 3 APs divided into the same AP group have the same coverage area, and then it may be ensured that the UE better implements handover between the APs in the same AP group. If a coverage dead zone is formed between coverage areas of two APs belonging to the same AP group, when being located in the coverage dead zone, the UE may not be connected with any AP in the AP group, and may also not be handed over to any AP, which may cause an interruption of WLAN service. If the UE is required to perform data transmission at this moment, data transmission is required to be performed through the LTE network, which may obviously reduce a network service effect.

The APs of the same AP group are connected to the same WT. Then, if information of an AP group is required to be reported through the WT, the information is reported through only one WT, and if the LTE network transmits control information to control the AP group through the WT, the control information is also only required to be transmitted through the WT. Therefore, more convenience is brought to information transmission and network control.

Different AP groups include different APs, which may be considered that any two AP groups include different APs, and in fact, one AP may be divided into only one AP group. Under the condition that an AP is located in two AP groups, when group parameters of the two AP groups are different, there may exist a conflict between parameter setting and function realization of the AP, thereby causing an unstable or failure state.

As a further improvement of the embodiment, Step S112 further includes the following actions.

The AP groups of which cross-group handover frequencies are higher than a first preset frequency are combined.

The AP groups where the APs of which cross-group handover frequencies are higher than a second preset frequency are located are regulated and processed.

The cross-group handover frequency may be a parameter determined based on the information of the handover frequency of the UE between the APs, and may also be information included in the first auxiliary information or the second auxiliary information.

For example, an AP group 1 and an AP group 2 are included. The UE frequently implements cross-group handover between the AP group 1 and the AP group 2, and when a cross-group handover frequency is higher than the first preset frequency, the two AP groups are combined into a new AP group. Then, the UE may be handed over more freely between each AP in the new AP group, and the network element of the LTE network (for example, the eNB) is prevented from being frequently requested to make a decision about cross-group handover.

For example, the AP group 1 includes an AP1, an AP2 and an AP3. The AP1 receives UE handed over from the AP group 2 with a high frequency, and also processes quitting of UE handed over from the AP group 1 to the AP group 2 with a high frequency. At this moment, for better implement handover of the UE between the AP1 and APs in the AP group 2, the AP1 may be regulated into the AP group 2. After regulation, the AP1 is added in the AP group 2, the AP1 is deleted from the AP group 1 with only the AP2 and the AP3 left.

As a further improvement of the embodiment, Step S112 further includes the following actions.

AP grouping is reperformed on the APs or AP groups of which the loads are higher than a specified load threshold, and the AP groups are updated.

In Step S112, according to the load condition information of the APs, the loads of single APs may be determined, and the loads of the whole AP groups may also be determined.

For example, when there is an excessive load in an AP group, and by AP group regulation, an AP of which a current load is relatively low is introduced to implement load balancing. When the load of a certain AP is excessively high and higher than the specified load threshold, it may be added into an AP group with a relatively low load. Load balancing may also be fast implemented through AP handover of the UE.

Step S112 further includes at least one of the following actions:

AP grouping is performed based on a first priority strategy preferably according to the first auxiliary information; or AP grouping is performed based on a second priority strategy preferably according to the second auxiliary information.

When the eNB or the WT, an execution main body, simultaneously acquires the first auxiliary information and the second auxiliary information, some overlapped information may be stored in the first auxiliary information and the second auxiliary information, and the specific information adopted as basis information for AP grouping is determined according to a priority strategy in the embodiment. Therefore, in the embodiment, AP grouping may be performed based on the first priority strategy preferably according to the first auxiliary information, and AP grouping may also be performed based on the second priority strategy preferably according to the second auxiliary information.

Here, the action of performing AP grouping preferably according to the first auxiliary information may include any one of the following actions: AP grouping is performed only based on the first auxiliary information; grouping is performed based on the first auxiliary information and information which does not exist in the first auxiliary information but exists in the second auxiliary information; or when the first auxiliary information and the second auxiliary information both provide reported information about the same parameter, when an estimated value is calculated, the reported parameter of the first auxiliary information may correspondingly be endowed with a higher weight.

Here, the operation that AP grouping is performed preferably according to the second auxiliary information may include any one of the following operations: AP grouping is performed only based on the second auxiliary information; grouping is performed based on the second auxiliary information and information which does not exist in the second auxiliary information but exists in the first auxiliary information; or when the second auxiliary information and the first auxiliary information both provide reported information about the same parameter, when an estimated value is calculated, the reported parameter of the second auxiliary information may correspondingly be endowed with a higher weight.

Of course, during specific implementation, there are no limits made by the abovementioned methods.

Of course, AP grouping may further be performed based on an information intersection of the first auxiliary information and the second auxiliary information in Step S120. The information intersection is information the first auxiliary information and the second auxiliary information both have, and when a difference between specific information contents of the information in the first auxiliary information and the second auxiliary information is smaller than a specified threshold value, the information is determined to be information in the information intersection. For example, the first auxiliary information reported by the UE includes the association time of 1 second of the AP1, and the second auxiliary information reported by the WT includes the association time of 1.01 seconds of the APE First of all, both the first auxiliary information and the second auxiliary information include the association time of the AP and a difference value of the association time is 0.01 second and smaller than the specified threshold value. At this moment, it may be considered that the information intersection of the first auxiliary information and the second auxiliary information includes the association time of the APE The method further includes that: attribute parameters of the AP groups are set based on the auxiliary information.

In the embodiment, the attribute parameters of the AP groups are further set. Here, the attribute parameters of the AP groups include parameters effective to all the APs in the whole AP groups. For example, parameters about whether the AP groups are temporarily forbidden from access and handover or not and the like are set.

By setting the attribute parameters of the AP groups, working states of the AP groups may be controlled, and handover between the APs may be indirectly controlled.

In a specific implementation process, the execution main body, for example, the eNB, may automatically send an auxiliary information acquisition request to the UE or the WT and receive the first auxiliary information or second auxiliary information returned by the UE or the WT based on the acquisition request.

After Step S112 is executed, the AP groups are determined, so that the AP group information is determined. The AP group information usually includes the identification information of the AP groups, the number of the APs and the AP information of each AP. The identification information of the AP groups may include the information about the group numbers.

It is important to note that: in the second manner, the method that the eNB performs AP grouping based on the auxiliary information to form the AP groups and finally forms the AP group information based on the AP groups is also applied to a technical solution that the network element of the WLAN forms the AP group information. For example, the WT also acquires the auxiliary information, where the auxiliary information also includes the first auxiliary information and the second auxiliary information; performs AP grouping based on the auxiliary information; and forms the AP group information after performing AP grouping to form the AP groups. The difference is that the WT sends the AP group information to the eNB after forming it.

Of course, in the second manner, since the eNB divides the AP groups, for convenience management and control of the WLAN, the eNB may further send the AP group information to the WT through the Xw interface in the embodiment.

In the first manner of the embodiment, if the network element of the WLAN performs AP grouping and forms the AP group information, the method further includes that: the first auxiliary information sent by the UE is received; and the first auxiliary information is sent to the WT through the Xw interface, where the WT adopts the first auxiliary information, to form the AP group information. In the embodiment, for avoiding modification to the communication protocol of the WLAN and reducing various difficulties caused by modification to the communication protocol of the WLAN, the UE sends the first auxiliary information to the WT through the eNB in the embodiment.

As a further improvement of the embodiment, Step S120 may include that: the AP group information is carried in an RRC reconfiguration message which is sent to the UE.

The eNB may send the AP group information to the UE through any other message. For example, dedicated signaling is added to transmit the AP group information. However, in the embodiment, for reducing a number of information interaction times between the eNB and the UE so as to reduce power consumption of the UE and also for simplifying transmission of the AP group information, the eNB may carry the AP group information in the RRC reconfiguration message which is sent to the UE in the embodiment, and in such a manner, the UE receives the AP group information upon reception of the RRC reconfiguration message.

The RRC reconfiguration message includes various kinds of messages. In the embodiment, for enabling the UE to fast parse the AP group information from the RRC reconfiguration message, Step S120 in the embodiment includes that: the AP group information is carried in measurement configuration information in RRC which is sent to the UE; or the AP group information is carried in tight coupling configuration information in RRC which is sent to the UE.

In a word, the embodiment provides the method for processing the AP group information, including an AP group information interaction method. No matter whether the execution main body of forming the AP group information is the eNB or the network element of the WLAN, the AP group information is sent to the UE through the eNB, so that simple interaction about the AP group information is implemented to ensure tight coupling of the WLAN and the LTE network.

The embodiment of the disclosure further provides a computer storage medium, in which a computer-executable instruction is stored, the computer-executable instruction being arranged to execute the method.

Equipment Embodiment

Figure 4:
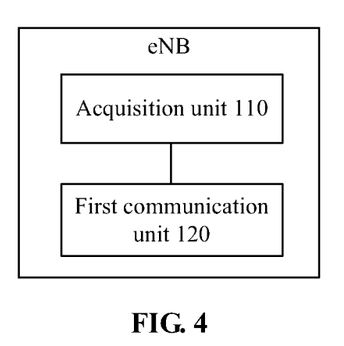
FIG. 4 is a structure diagram of an eNB according to an embodiment of the disclosure.

As shown in FIG. 4, the embodiment provides an eNB, which includes an acquisition unit 110 and a first communication unit 120.

The acquisition unit 110 is arranged to acquire AP group information of AP groups; and The first communication unit 120 is arranged to send the AP group information to UE through a downlink message via an air interface of the eNB.

The eNB is an evolved Node B, the acquisition unit 110 may include a communication interface. The communication interface may be, for example, a receiving antenna. The AP group information sent by a WT is received from an Xw interface. The acquisition unit 110 may further include equipment such as a processor, and is arranged to autonomously form the AP group information.

The first communication unit 120 may include a communication interface communicating with the UE, for example, a mobile transceiver antenna or an antenna array.

The first communication unit 120 sends the AP group information to the UE, and has a characteristic of convenience for implementation.

Two processing structures of the acquisition unit 110 will be provided below.

First Structure:

the acquisition unit 110 is arranged to receive the AP group information sent from the WT.

In this structure, the acquisition unit 110 includes a communication interface capable of communicating with the WT, and directly receives the AP group information from the WT.

Second Structure:

the acquisition unit 110 is arranged to receive auxiliary information, where the auxiliary information includes at least one of first auxiliary information sent from the UE or second auxiliary information formed by the WT; perform AP grouping to form the AP groups based on the auxiliary information according to a grouping strategy; and form the AP group information of the AP groups.

In this structure, the acquisition unit 110 may include a receiving module and a processing module. The receiving module is arranged to be a communication interface receiving the auxiliary information from the WT or the UE. The communication interface is usually a wireless communication interface. The processing module may include various types of processors or processing circuits, for example, an application processor, a central processing unit, a microprocessor, a digital signal processor, a programmable array and an application-specific integrated circuit.

When the structure of the acquisition unit 110 is the second structure, the eNB further includes a second communication unit, arranged to send the AP group information to the WT for the WT to implement management and control over APs. During specific implementation, the eNB may also not be required to send the AP group information to the WT.

When the structure of the acquisition unit 110 is the first structure, the first communication unit 120 is further arranged to receive the first auxiliary information sent from the UE. The eNB further includes: the second communication unit, arranged to send the first auxiliary information to the WT through the Xw interface, where the WT adopts the first auxiliary information sent to the WT, to form the AP group information.

For avoiding modification to a communication protocol of a WLAN so as to avoid difficulties in first auxiliary information transmission of the WLAN, in the embodiment, the eNB receives the first auxiliary information sent from the UE and sends the first auxiliary information to the WT. In such a manner, interaction about the first auxiliary information between the UE and the eNB is conveniently implemented in a process of forming the AP group information.

In addition, the first communication unit 120 is further arranged to carry the AP group information in an RRC reconfiguration message which is sent to the UE.

In the embodiment, for reducing a number of information interaction times between the eNB and the UE and reducing power consumption of the UE, the first communication unit 120 in the embodiment may carry the AP group information in the RRC reconfiguration message which is sent to the UE.

Optionally, the first communication unit 120 is arranged to carry the AP group information in measurement configuration information which is sent to the UE, or carry the AP group information in tight coupling configuration information which is sent to the UE.

In a word, the eNB of the embodiment may be arranged to send the AP group information to the UE, may be hardware equipment implementing the method embodiment, and avoids the problems of great communication difficulties and the like caused by transmission of the AP group information to the UE through a network element of the WLAN.

Some specific examples will be provided below in combination with any abovementioned embodiment.

Example 1

The example provides a method for processing AP group information. In the example, AP group information is related information of AP groups. The method includes AP group division and AP group information determination.

Figure 5:
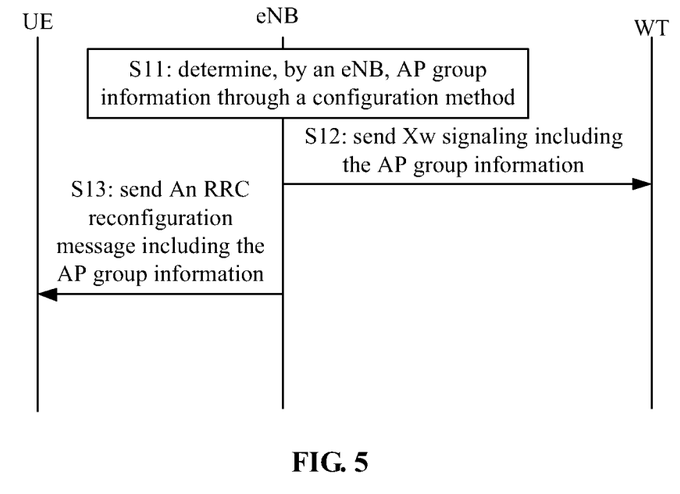
FIG. 5 is a second flowchart of a method for processing AP group information according to an embodiment of the disclosure.

As shown in FIG. 5, the method of the example includes the following steps.

In Step S11, an eNB determines AP group information through a configuration method.

The AP group information includes the following contents:

group numbers;
numbers of APs included in AP groups; and
information of each AP: a BSSID, an SSID, MAC, a frequency point and the like.

In the embodiment, the AP group information represents that 3 AP groups are included, specifically as follows:

an AP group 1: an AP1, an AP2 and an AP3;
an AP group 2: an AP4 and an AP5; and
an AP group 3: an AP6.

In Step S12, the eNB sends Xw signaling including the AP group information to a WT. Specifically, for example, the AP group information is notified to the WT through an Xw control plane protocol interface.

In Step S13, the eNB notifies the AP group information to UE through a downlink message cell via an air interface. Specifically, for example, an RRC reconfiguration message including the AP group information is sent to the UE.

The downlink message cell via the air interface may be one of:

1) a measurement configuration information cell in the RRC reconfiguration message, wherein the measurement configuration information cell is a field arranged to carry measurement reconfiguration information, and may further be arranged to carry the AP group information; or 2) a tight coupling configuration information cell in the RRC reconfiguration message, wherein the tight coupling configuration information cell is a field arranged to carry tight coupling configuration information, and may further be arranged to carry the AP group information.

Example 2

Figure 6:
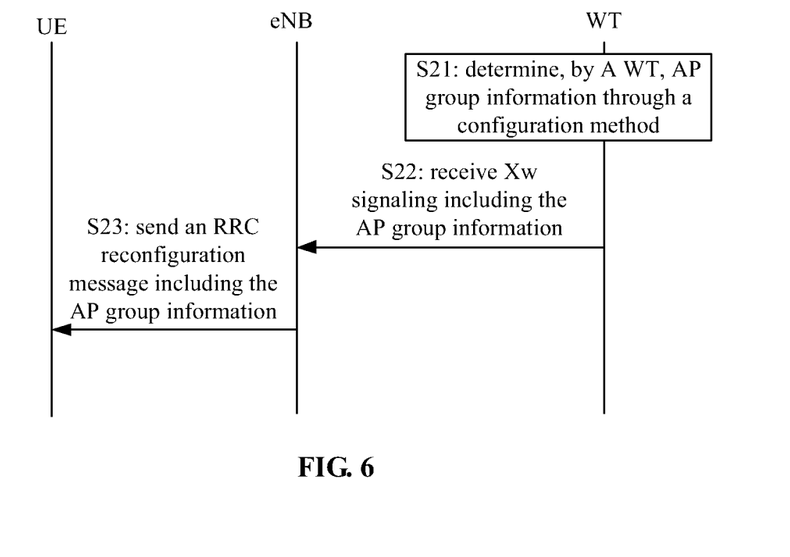
FIG. 6 is a third flowchart of a method for processing AP group information according to an embodiment of the disclosure.

As shown in FIG. 6, a method of the example includes the following steps.

In Step S21, a WT determines AP group information through a configuration method. The WT usually determines the AP group information based on AP groups, and under a normal condition, the AP groups may also be determined by the WT by AP grouping.

In Step S22, an eNB receives Xw signaling including the AP group information.

In Step S23, the eNB sends an RRC reconfiguration message including the AP group information to UE.

A method for the WT to determine the AP group information in a certain manner will be introduced below.

First manner: a network element of a WLAN determines the AP group information through an internal configuration method. For example, 3 AP groups are set: an AP group 1, an AP group 2 and an AP group 3, the AP group 1 includes an AP1, an AP2 and an AP3, the AP group 2 includes an AP4 and an AP5, and the AP group 3 includes an AP6.

A second manner: the WT dynamically acquires related information of APs connected with it in the WLAN, and forms an AP group or N AP groups through a neighboring relationship, N being an integer not smaller than 2.

In Step S22, the eNB receives the Xw signaling including the AP group information, where the WT notifies the AP group information to the eNB through an Xw control plane protocol interface.

In Step S23, the eNB sends the RRC reconfiguration message including the AP group information to the UE.

Example 3

Figure 7:
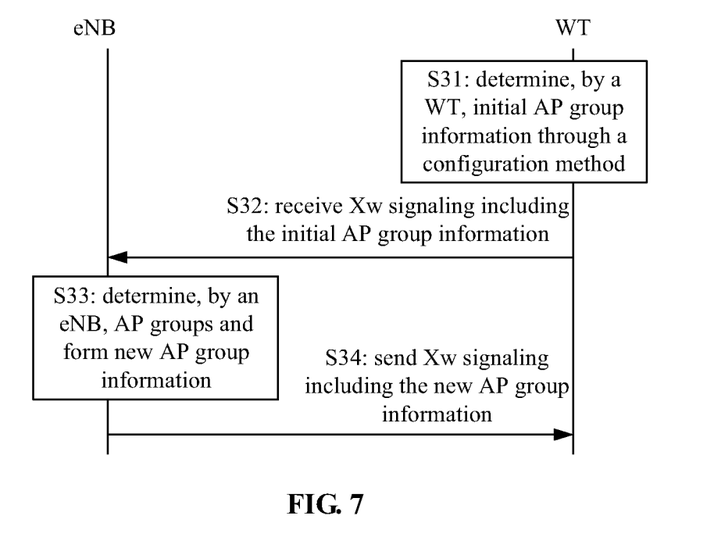
FIG. 7 is a fourth flowchart of a method for processing AP group information according to an embodiment of the disclosure.

As shown in FIG. 7, a method of the example includes the following steps.

In S31, a WT determines initial AP group information through a configuration method, including that the initial AP group information is determined based on initial AP grouping.

In Step S32, an eNB receives Xw signaling including the initial AP group information.

In Step S33, the eNB determines AP groups and forms new AP group information. In the step, the eNB may reperform AP grouping based on the initial AP group information and auxiliary information and form the AP group information.

In Step S34, the eNB sends Xw signaling including the new AP group information to the WT.

During specific implementation, the eNB may further send the AP group information to UE.

For example, the WT determines the initial AP group information. For example, 3 AP groups are set: an AP group 1, an AP group 2 and an AP group 3, the AP group 1 includes an AP1, an AP2 and an AP3, the AP group 2 includes an AP4 and an AP5, and the AP group 3 includes an AP6. The WT network element notifies the initial AP group information to a network element on a 3GPP system access network side through an Xw control plane protocol interface. The eNB further reperforms AP grouping in a certain manner, and forms the new AP group information.

The certain manner is to, for example, find an abnormity of an AP by reporting of the UE. For example, the UE always cannot be associated with the two APs in the AP group 2 or a number of association failures is larger than a certain threshold value, and then the AP group information is further determined to be two groups: the AP group 1 and the AP group 3.

In the example, there is no sequence between Step S34 and sending of the AP group information to the UE. Step S34 may be executed at first, and then the AP group information is sent to the UE. The AP group information may also be sent to the UE at first, and then Step S34 is executed.

Example 4

Figure 8:
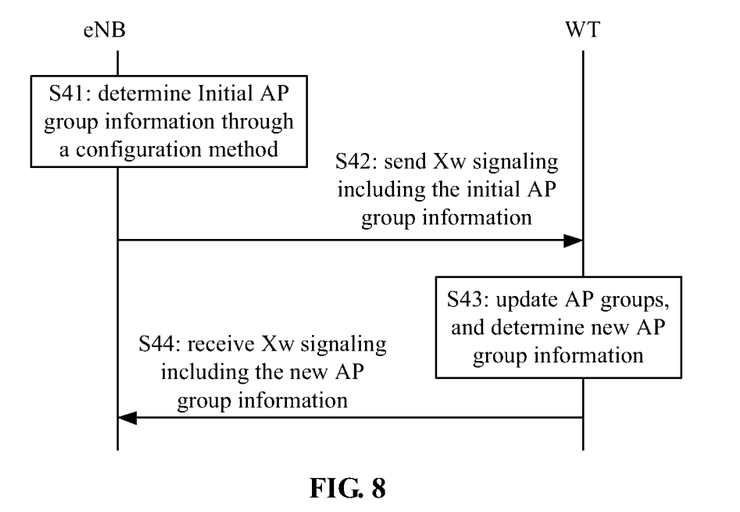
FIG. 8 is a fifth flowchart of a method for processing AP group information according to an embodiment of the disclosure.

As shown in FIG. 8, the example includes the following steps.

In Step S41, an eNB determines initial AP group information through a configuration method, where the initial AP group information in the example is consistent with the initial AP group information in the previous example.

In Step S42, Xw signaling including the initial AP group information is sent to a WT.

In Step S43, the WT updates AP groups, and determines new AP group information, and the WT updates the AP groups based on the initial AP group information.

In Step S44, Xw signaling including the new AP group information is received, where the Xw signaling is sent to the eNB by the WT.

During specific implementation, the eNB may further send the AP group information to the UE. For example, the eNB parses the Xw signaling, extracts the AP group information in the Xw signaling, and carries the AP group information in a downlink air interface for sending to UE. The WT does not send the AP group information to the UE through the WLAN.

For example, the eNB determines the initial AP group information. For example, 3 AP groups are set: an AP group 1, an AP group 2 and an AP group 3, the AP group 1 includes an AP1, an AP2 and an AP3, the AP group 2 includes an AP4 and an AP5, and the AP group 3 includes an AP6.

The eNB notifies the initial AP group information to a network element of a WLAN system through an Xw control plane protocol interface.

The WT further determines the AP group information in a certain manner.

The certain manner is to find an unavailable AP. For example, it is found that the two APs of the AP group 2 are unavailable, then AP grouping is further reperformed, new AP groups are formed based on a result obtained by reperforming AP grouping, including two AP groups: the AP group 1 and the AP group 3, and the AP group information is formed based on the new AP groups.

The WT notifies the eNB network element through the Xw control plane protocol interface.

In some embodiments provided by the application, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling, or direct coupling or communication connection between each displayed or discussed component may be indirect coupling or communication connection, implemented through some interfaces, of the equipment or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing module, each unit may also exist independently, and two or more than two unit may also be integrated into a unit. The integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

By the technical solutions, an LTE network element such as the eNB may conveniently perform AP management and control based on the AP group information. The problems of tedious transmission of the AP group information, modification to a communication protocol for interaction between the WLAN and the UE and the like, caused by a requirement on sending of the AP group information through a connection of the WLAN and the UE, are avoided.

The invention claimed is:

1. A method for processing Access Point (AP) group information, the method comprising:
   acquiring, by a base station, AP group information of one or more AP groups; and
   sending, by the base station, the AP group information to a User Equipment (UE) through a downlink message via an air interface of the base station,
   wherein acquiring, by the base station, the AP group information of the one or more AP groups comprises:
      receiving auxiliary information, wherein the auxiliary information comprises at least one of first auxiliary information sent from the UE or second auxiliary information formed by a Wireless Local Area Network Termination (WT);
      performing AP grouping to form the one or more AP groups based on the auxiliary information according to a grouping strategy; and
      forming the AP group information of the one or more AP groups.

2. The method according to claim 1, wherein acquiring, by the base station, the AP group information of the one or more AP groups, further comprises:
   receiving the AP group information sent from the WT.

3. The method according to claim 1, further comprising:
   sending the AP group information to the WT through an Xw interface.

4. The method according to claim 1, further comprising:
   upon reception of the first auxiliary information sent from the UE, sending the first auxiliary information to the WT through an Xw interface,
   wherein the WT adopts the first auxiliary information sent to the WT, to form the AP group information.

5. The method according to claim 1, wherein the sending, by the base station, the AP group information to the UE through the downlink message via the air interface of the base station, comprises:
   carrying the AP group information in a Radio Resource Connection (RRC) reconfiguration message which is sent to the UE.

6. The method according to claim 5, wherein the carrying the AP group information in the RRC reconfiguration message which is sent to the UE, comprises:
   carrying the AP group information in measurement configuration information which is sent to the UE;
   or
   carrying the AP group information in tight coupling configuration information which is sent to the UE.

7. The method according to claim 1, wherein
   the first auxiliary information comprises at least one of:
      AP information of APs scanned by the UE, AP information of APs which may be associated by the UE, service condition information of each AP used by the UE within a specified time, AP information of APs which are measured and determined to be unavailable by the UE, AP information of APs which may be scanned but may not be associated by the UE, association time information of APs, load condition information of APs, information about APs of which association time is longer than a preset association threshold, information about APs of which loads are higher than a preset load threshold or information about a handover frequency of the UE between APs, and
   the second auxiliary information comprises at least one of: position information of APs, information about a neighboring relationship between APs, initial AP group information, AP information of unavailable APs, AP information of APs which may be scanned but may not be associated, association time information of APs, load condition information of APs, information about APs of which association time is longer than a preset association threshold, information about APs of which loads are higher than a preset load threshold, network element connection information of APs or information about a handover frequency of the UE between APs.

8. The method according to claim 1, wherein performing AP grouping to form the one or more AP groups based on the auxiliary information according to the grouping strategy, comprises at least one of:
   coverage areas of N APs of a same AP group are continuously distributed, wherein N being an integer not smaller than 1;
   APs of the same AP group are connected to a same WT; or
   different AP groups include different APs.

9. A base station, comprising:
   a first communication interface, arranged to receive first auxiliary information sent from a User Equipment (UE);
   a second communication interface, arranged to receive second auxiliary information formed by a Wireless Local Area Network Termination (WT); and
   a processor, arranged to perform Access Point (AP) grouping to form one or more AP groups based on at least one of the first auxiliary information or the second auxiliary information according to a grouping strategy and to form AP group information of the one or more AP groups,
   wherein the first communication interface is further arranged to
   send the AP group information to a the UE through a downlink message via an air interface of the base station.

10. The base station according to claim 9, wherein
    the second communication interface is further arranged to receive the AP group information sent by the WT.

11. The base station according to claim 9, wherein
    the second communication interface is further arranged to send the AP group information to the WT through an Xw interface.

12. The base station according to claim 9, wherein
    the first communication interface is further arranged to receive the first auxiliary information sent from the UE,
    the second communication interface is further arranged to send the first auxiliary information to the WT through an Xw interface, and
    the WT adopts the first auxiliary information sent to the WT, to form the AP group information.

13. The base station according to claim 9, wherein
the first communication interface is further arranged to
carry the AP group information in a Radio Resource
Connection (RRC) reconfiguration message which is
sent to the UE.

14. The base station according to claim 13, wherein
the first communication interface is further arranged to
implement the carrying of the AP group information in
the RRC reconfiguration message which is sent to the
UE in the following actions: carrying the AP group
information in measurement configuration information
which is sent to the UE; or carrying the AP group
information in tight coupling configuration information
which is sent to the UE.

* * * * *